(Model.)
O. E. WAIT.
FRICTION CLUTCH.
No. 258,686. Patented May 30, 1882.
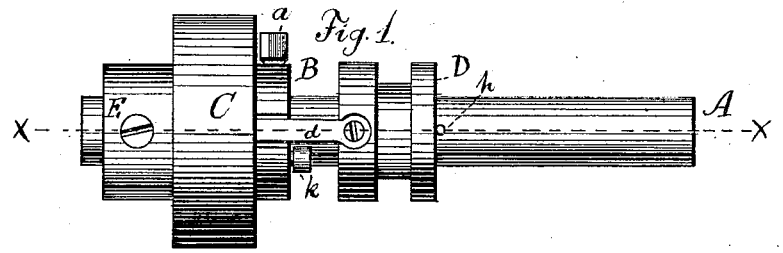
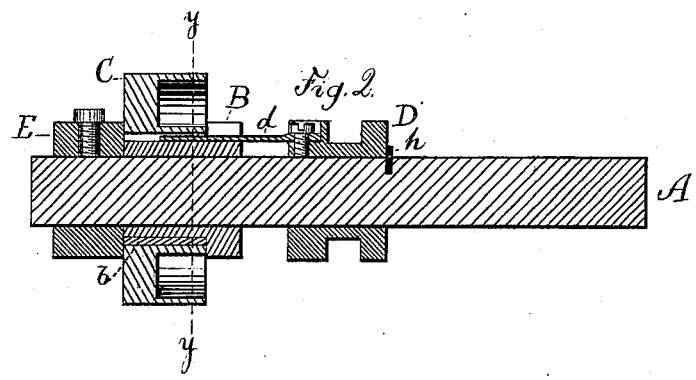
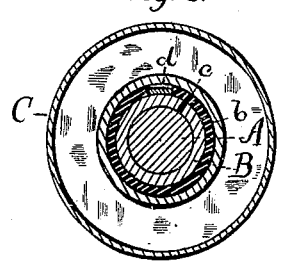
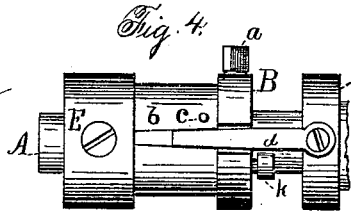
Witnesses
John Edwards Jr.
S. S. Burr
Inventor
Oscar E. Wait
By James Shepard
Atty.

UNITED STATES PATENT OFFICE.

OSCAR E. WAIT, OF WOONSOCKET, RHODE ISLAND, ASSIGNOR OF TWO-THIRDS TO PHILETUS W. GOULD, OF PITTSFIELD, MASSACHUSETTS, AND FRANKLIN E. DARROW, OF BRISTOL, CONNECTICUT; AMELIA W. DARROW AND ELBERT E. THORPE, OF BRISTOL, CONNECTICUT, ADMINISTRATORS OF FRANKLIN E. DARROW, DECEASED.

FRICTION-CLUTCH.

SPECIFICATION forming part of Letters Patent No. 258,686, dated May 30, 1882.

Application filed May 3, 1880. (Model.)

*To all whom it may concern:*

Be it known that I, OSCAR E. WAIT, of Woonsocket, in the county of Providence and State of Rhode Island, have invented certain new and useful Improvements in Friction-Clutches, of which the following is a specification.

The invention relates to a friction-clutch in which a divided ring forms the axle upon which the pulley revolves when the shaft is not in motion, proper means being provided for opening and closing said ring and rigidly connecting it with the main shaft, as hereinafter described.

In the accompanying drawings, Figure 1 is a side elevation of a mounted friction-clutch which embodies my invention. Fig. 2 is a longitudinal section of the same on line $x\,x$ of Fig. 1. Fig. 3 is a transverse section of the same on line $y\,y$ of Fig. 2, and Fig. 4 is a side elevation of the clutch mechanism with the pulley removed therefrom.

A designates a short piece of a shaft upon which the device is mounted.

B designates a flanged hub, having a set-screw, $a$, in its flanged end by which to adjust it in place upon and secure it to the shaft A. The length of the small part of the hub B outside of the shoulder of its flange is intended to be just equal to the axial length of the pulley C. A divided ring, $b$, is placed upon the neck of the hub B, and is rigidly secured thereto by means of screws or pins $c$ or other suitable fastening. I prefer to form this ring $b$ by first making a solid ring properly fitted to the interior of the hub of the pulley C, so as to allow said pulley to turn freely thereon after the manner of a loose pulley. Then not only split the ring, but take out a piece large enough to form a division or slot between its two ends which will admit the shipper-wedge $d$, secured to the shipper D. The ring is then pinned or otherwise secured to the hub B, as before described. The flange of the hub B is also slotted to allow the wedge $d$ to pass through it, said wedge being tapered on its edges so as to be the narrowest at its forward end. The pulley is merely slipped on over the divided ring, as shown, and is held in place by the shoulder of the flanged hub B and the collar E.

A small pin, $h$, or any other suitable stop or shoulder is employed to limit the motion of the shipper-ring D in one direction, while a set-screw, $k$, in the end of the hub B may be adjusted to limit its motion in the opposite direction and regulate the degree of expansion imparted to the ring $b$. When the shipper is in the position represented in Figs. 1 and 2 the ring $b$ sets snugly upon the neck of the hub B and forms the axle, upon which the pulley can turn freely after the usual manner of a loose pulley. By throwing the shipper and wedge toward the pulley the wedge acts directly upon and between the divided ends of the ring $b$, so as to expand said ring and firmly bind its periphery against the entire inner surface of the central bore of the pulley C. The throw of the shipper-ring can be made very short, if desired.

The action of the clutch is quick and effective, while the device is in very compact form. The construction is very simple and inexpensive, and the pulley can be of any ordinary form and fitted to the ring in the same simple manner that it would be fitted to any other axle.

The hub B, ring $b$, and wedge $d$ constitute the clutch mechanism proper, and by constructing them in the manner shown and described, so that they form the axle on which the pulley takes all of its axial bearing, I am enabled to fit this clutch mechanism to any ordinary pulley without any change whatever in the construction of said pulley except merely to make its central bore of the proper size. This feature of my invention I believe to be radically new, and its advantages are numerous in addition to those already named. It enables the split ring to be made of a much less diameter than that of any similar split ring in prior chucks, so that it does not need to be expanded to so great an extent as do rings of a larger diameter, and therefore the taper of the wedge may be much less, so that it can be more easily operated, and all levers to obtain the necessary purchase on the more abruptly tapering wedges are dispensed with. An example of an abruptly-tapering wedge and ring of a large diameter is shown in the patent to J. W. Anthoine, No. 201,587, March 26, 1878. Another advantage arising from my construction is that it relieves the shaft from all wear of the pulley, and the wedge may be adjusted to open the ring more or less, so that a good fit of the pulley can always be maintained, which is not the case where a pulley takes its bearing on the shaft instead of upon the clutch mechanism.

I am aware that a friction-clutch is described in a prior patent as having a divided ring fitted to and acting upon the rim of a loose pulley, while the central bore of said pulley was fitted to a shaft in the ordinary manner, and I hereby disclaim said clutch.

I am also aware that a prior patent shows a divided spring-ring secured to and around the hub of a pulley, said ring being contracted when desired to gripe the shaft by means of a cone, and I hereby disclaim the same.

I am also aware that a prior patent for a clutch shows a pulley of a special construction provided with a central bore upon one side which fits the shaft and constitutes the axle bearing-surface of said pulley, and with a larger central bore upon the opposite side which receives a friction-shoe, divided ring, and hub, said ring being expanded and contracted by means of a sliding cone, angle-lever, adjusting-screw, wedge, and spring, which prior device is also disclaimed.

I claim as my invention—

1. The combination of the ordinary pulley C, having the ordinary central bore which constitutes its axial bearing and which embraces the clutch mechanism, the hub B, having the part outside the shoulder of its flange substantially equal in length to that of the axial bore of the pulley, the divided ring $b$, secured to the hub B and fitted to the smallest axial bore of said pulley, and the shipper-wedge $d$, substantially as described, and for the purpose specified.

2. The combination of the hub B, divided ring $b$, pulley C, shipper-ring D, having the wedge $d$ secured thereto, and the set-screw $k$, inserted in the hub B and acting as an adjustable stop to limit the motion of the shipper-ring toward the hub B, substantially as described, and for the purpose specified.

3. The combination of the shaft A, a friction-clutch mechanism mounted on said shaft, and the pulley C, having its smallest axial bore embracing the clutch mechanism, the whole being so combined, in the manner substantially as hereinbefore described, that when the pulley is revolving and the shaft is stationary the pulley takes all of its bearing axially upon the clutch mechanism instead of upon the shaft.

OSCAR E. WAIT.

Witnesses:
EDWIN ALDRICH,
EDWARD THURBER.